US009751462B2

(12) United States Patent
Compton

(10) Patent No.: US 9,751,462 B2
(45) Date of Patent: Sep. 5, 2017

(54) VEHICLE AND VEHICLE DOOR CLEARANCE NOTIFICATION SYSTEM

(71) Applicant: FORD GLOBAL TECHNOLOGIES, LLC, Dearborn, MI (US)

(72) Inventor: Grant A. Compton, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 14/729,417

(22) Filed: Jun. 3, 2015

(65) Prior Publication Data
US 2016/0355127 A1  Dec. 8, 2016

(51) Int. Cl.
*B60Q 9/00* (2006.01)
*E05D 11/10* (2006.01)
*E05F 15/43* (2015.01)

(52) U.S. Cl.
CPC ............ *B60Q 9/00* (2013.01); *E05D 11/1071* (2013.01); *E05F 15/43* (2015.01); *E05Y 2201/624* (2013.01); *E05Y 2201/638* (2013.01); *E05Y 2900/531* (2013.01)

(58) Field of Classification Search
CPC .......... B60Q 9/00; B60Q 9/002; B60Q 9/004; B60Q 9/005; B60Q 9/007; B60Q 9/008; B60R 21/0134; E05F 5/025; E05F 15/40; E05F 15/43; E05F 2015/432; E05F 2015/433; E05F 2015/434; E05F 2015/483; E05Y 2400/32; E05Y 2900/531; E05Y 2900/546; G08G 1/16; G08G 1/166; G08G 1/168

USPC ..................... 340/435, 436, 932.2
See application file for complete search history.

(56) References Cited

U.S. PATENT DOCUMENTS

| 7,193,509 B2 | 3/2007 | Bartels et al. | |
|---|---|---|---|
| 2005/0242618 A1* | 11/2005 | Menard | E05F 15/43 296/146.4 |
| 2005/0280284 A1* | 12/2005 | McLain | B60R 13/043 296/146.1 |
| 2007/0234520 A1* | 10/2007 | Faubert | E05D 3/18 16/357 |
| 2008/0294314 A1* | 11/2008 | Morris | E05F 5/00 701/49 |
| 2013/0085975 A1 | 4/2013 | Wellhoefer et al. | |

(Continued)

FOREIGN PATENT DOCUMENTS

| DE | 4119579 A1 | 12/1992 |
|---|---|---|
| DE | 10312252 A1 | 9/2004 |

(Continued)

*Primary Examiner* — Quan-Zhen Wang
*Assistant Examiner* — Stephen Burgdorf
(74) *Attorney, Agent, or Firm* — Frank MacKenzie; Brooks Kushman P.C.

(57) ABSTRACT

A vehicle is provided. The vehicle includes a door and a controller. The door is configured to transition to a partially opened position between a fully opened position and a closed position. The controller is programmed to issue an insufficient door clearance notification in response to an object being detected within a swing radius of the door between the closed position and the partially opened position. The controller may be further programmed to issue the insufficient door clearance notification in response to an object being detected within an egress path from the partially opened position of the door.

18 Claims, 4 Drawing Sheets

(56) References Cited

U.S. PATENT DOCUMENTS

| | | | | |
|---|---|---|---|---|
| 2013/0234844 | A1* | 9/2013 | Yopp | B60Q 9/008 340/435 |
| 2015/0232027 | A1* | 8/2015 | Freitas | B60Q 9/008 340/435 |
| 2016/0024825 | A1* | 1/2016 | Warschat | E05F 15/43 701/49 |
| 2016/0208537 | A1* | 7/2016 | Senguttuvan | B60W 50/0098 |

FOREIGN PATENT DOCUMENTS

| | | | |
|---|---|---|---|
| DE | 102004049054 A1 | 4/2006 | |
| DE | 102010051242 A1 | 8/2011 | |
| DE | 102011079003 A1 | 1/2013 | |
| JP | 2007277900 A * | 10/2007 | E05F 15/20 |

\* cited by examiner

VEHICLE AND VEHICLE DOOR CLEARANCE NOTIFICATION SYSTEM

TECHNICAL FIELD

The present disclosure relates to vehicles having doors.

BACKGROUND

Vehicle doors may include a hinge mechanism that allows the door to maintain at least one partially opened position between a closed position and a fully opened position.

SUMMARY

A vehicle is provided. The vehicle includes a door and a controller. The door is configured to transition to a partially opened position between a fully opened position and a closed position. The controller is programmed to issue an insufficient door clearance notification in response to an object being within a swing radius of the door between the closed position and the partially opened position. The controller may be further programmed to issue the insufficient door clearance notification in response to an object being within an egress path from the partially opened position of the door.

A vehicle is provided. The vehicle includes a door, a detent arm, and a controller. The detent arm is configured to retain the door in at least one partially opened position. The controller is programmed to issue an insufficient door clearance notification in response to an object being within a swing radius of the door between a closed position and a partially opened position. The controller may be further programmed to issue the insufficient door clearance notification in response to an object being within an egress path from the partially opened position of the door.

A method of warning a user of an obstruction between an object and a vehicle door is provided. The method includes issuing an insufficient door clearance notification in response to an object being within a swing radius of the door between a closed position and a partially opened position. The method may also include issuing an insufficient door clearance notification in response to an object being within an egress path from the first partially opened position of the door. A sufficient door clearance notification may be issued in response to the absence of an object being within the swing radius of the door between the closed position and the partially opened position or the absence of an object within the egress path from the first partially opened position of the door.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
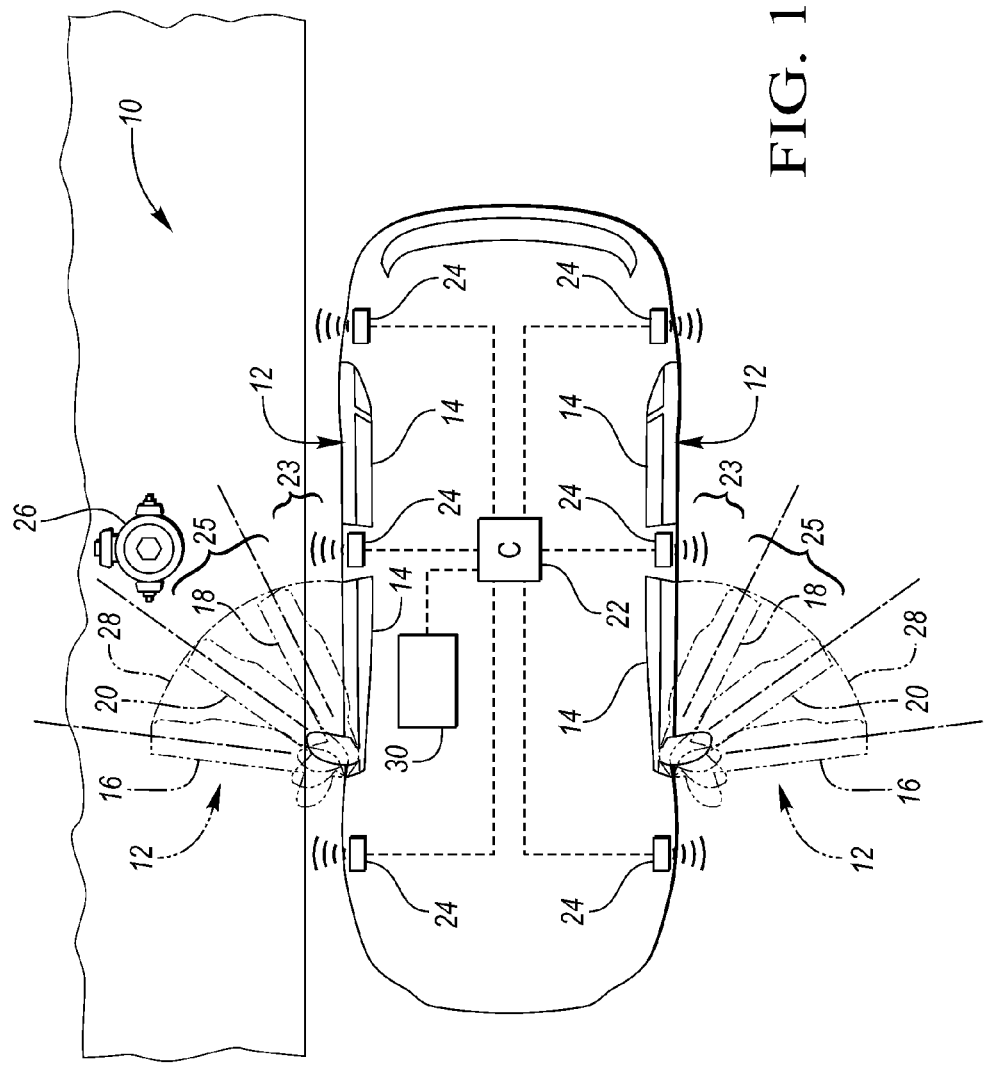
FIG. 1 is a schematic top view of a vehicle illustrating partially opened positions of the vehicle doors.

Referring to FIG. 1, a vehicle 10 is illustrated. The vehicle 10 may be a motor vehicle such as an automobile, a truck, farm equipment, or military transport vehicle. The vehicle 10 includes doors 12 that are configured to transition between closed positions 14 and fully opened positions 16. The doors 12 may also be configured to transition to partially opened positions between the closed positions 14 and fully opened positions 16. In the illustrated embodiment, the doors 12 are shown to transition to first partially opened positions 18 and second partially opened positions 20. It should be understood, however, that the doors 12 of the vehicle 10 may be configured to transition to one or more partially opened positions between the closed positions 14 and fully opened positions 16. The doors 12 may include hinge mechanisms that are configured to detain the doors 12 in the partially opened positions.

The vehicle 10 may include a controller 22. The controller 22 may be in communication with at least one sensing device 24 that is configured to detect the presence of an object 26 within and/or beyond a swing radius 28 of any of the doors 12. The sensing devices 24 may be further configured to determine the distance of an object 26 from the vehicle 10 and/or whether the object 26 is located within and/or beyond the swing radius 28 of any of the doors 12 between the closed position 14 and a partially opened position, including the first partially opened position 18 and second partially opened position 20.

The sensing device 24 may be any type of device that is capable of detecting the presence of an object. The sensing device 24 may also be any type of device that is capable of determining distances to detected objects relative to the sensing device itself or relative to another reference point. For example, the sensing device 24 may be an ultrasonic sensor, proximity sensor, laser sensor, LIDAR, RADAR, camera, light-field camera, etc. The sensing device 24 may be a sensor that is also utilized for another function, such as a blind spot detection sensor that is used to determine if an object is in the vehicle's blind spot or a parking proximity sensor that is used to detect the presence of objects in order to avoid collisions while parking the vehicle 10. In the illustrated embodiment, six sensing devices 24 are shown. It should be understood, however, that one or more sensing devices 24 may be utilized.

The object 26 depicted in FIG. 1 is a fire hydrant, however it should be understood that the sensing devices 24 are configured to detect any object that may be within and/or beyond a swing radius 28 of any of the doors 12, including street signs, curbs, trees, buildings, adjacently parked vehicles, etc.

The controller 22 may be programmed to issue an insufficient door clearance notification in response to one of the sensing devices 24 detecting an object 26 within a swing radius 28 of any of the doors 12 between the closed position 14 and a partially opened position.

For example, a first insufficient door clearance notification may be issued in response to an object 26 within a swing radius 28 of any of the doors 12 between the closed position 14 and the first partially opened position 18. Alternatively, a first sufficient door clearance notification may be issued in response to the absence of an object 26 within a swing radius 28 of any of the doors between the closed position 14 and the first partially opened position 18. Additionally, a second insufficient door clearance notification may be issued in response to an object 26 within a swing radius 28 of any of the doors 12 between the closed position 14 and the second partially opened position 20. Alternatively, a second sufficient door clearance notification may be issued in response to the absence of an object 26 within a swing radius 28 of any of the doors between the closed position 14 and the second partially opened position 20.

The controller 22 may also be programmed to issue the insufficient door clearance notification in response to one of the sensing devices 24 detecting an object 26 within an egress path from the first partially opened position of the door 23 or detecting an object 26 within an egress path from the second partially opened position of the door 25. Both egress paths 23, 25 may extend beyond the swing radius 28 of the door 12. The egress path from the first partially opened position of the door 23 extends from the door 12 when in the first partially opened position 18 to the body of the vehicle 10. The egress path from the second partially opened position of the door 25 extends from the door 12 when in the second partially opened position 20 to the body of the vehicle 10. The egress path from the second partially opened position of the door 25 may include the egress path from the first partially opened position of the door 23.

The controller may be further be programmed to issue an insufficient door clearance notification only if an object is within either egress path 23, 25 up to a certain distance away from either the vehicle 10 or a certain distance away from the swing radius 28. For example, if an object is located at a distance away from the vehicle 10 beyond the fully opened position 16 of the door 12, but is however within the egress path from the second partially opened position of the door 25, the insufficient door clearance notification may be omitted. Another example may include omitting the insufficient door clearance notification if an object is within either egress path 23, 25 but is located at a sufficient distance from the swing radius 28 of the door 12.

Additionally, the first sufficient door clearance notification and the second sufficient door clearance notification may be issued in response to the absence of an object 26 within the egress path from the first partially opened position of the door 23 or the absence an object 26 within the egress path from the second partially opened position of the door 25, respectively.

Either the insufficient or sufficient door clearance notifications (including the first and second insufficient and sufficient door clearance notifications) may include a clearance distance beyond a partially opened position. For example, a first insufficient door clearance notification may be issued in response to an object 26 within a swing radius 28 of any of the doors 12 between the closed position 14 and a clearance distance beyond the first partially opened position 18. Alternatively, a first sufficient door clearance notification may be issued in response to the absence of an object 26 within a swing radius 28 of any of the doors between the closed position 14 and the clearance distance beyond first partially opened position 18. Additionally, a second insufficient door clearance notification may be issued in response to an object 26 within a swing radius 28 of any of the doors 12 between the closed position 14 and a clearance distance beyond the second partially opened position 20. Alternatively, a second sufficient door clearance notification may be issued in response to the absence of an object 26 within a swing radius 28 of any of the doors between the closed position 14 and the clearance distance beyond second partially opened position 20.

The controller 22 may also be in communication with a notification or warning device 30. The notification or warning device 30 may be configured to issue any of the insufficient door clearance notifications or sufficient door clearance notifications described above. The notification warning device 30 may be visual, audible, or haptic in nature. A visual warning device may comprise illuminating an LED or illuminating an indicator light on a control panel. For example, the side mirrors associated with each door 12 may have an LED or series of LEDs that illuminate based on whether the specific door 12 has insufficient or sufficient clearance between the closed position 14 and the first partially opened position 18 and/or the second partially opened position 20. Alternatively, an indicator on an instrument panel may be configured to illuminate or flash on and off if there is insufficient clearance between the closed position 14 and any of the partially opened positions of any of the doors 12. In instances where an indicator on the instrument panel is shared with another function, such as blind spot detection indicator, the indicator may be configured to illuminate during blind spot detection and flash on and off when there is insufficient clearance between the closed position 14 and any of the partially opened positions of any of the doors 12. An audible warning device may comprise generating sounds through a speaker system based on whether there is insufficient or sufficient clearance between the closed position 14 and any of the partially opened positions. Specific sounds may correspond to insufficient or sufficient clearance notifications for specific partially opened positions. A haptic warning device may comprise a series of haptic motors that generate vibrations based on whether there is insufficient or sufficient clearance between the closed position 14 and any of the partially opened positions. Specific vibration frequencies or locations in the vehicle 10 where the vibrations may occur may correspond to insufficient or sufficient clearance notifications for specific partially opened positions. The haptic warning device may include haptic motors that may be placed in various positions of the vehicle, including but not limited to, door handles, vehicle seats, and/or the vehicle steering wheel.

While illustrated as one controller, the controller 22 may be part of a larger control system and may be controlled by various other controllers throughout the vehicle 10, such as a vehicle system controller (VSC). It should therefore be understood that the controller 22 and one or more other controllers can collectively be referred to as a "controller" that controls various functions of the vehicle 10 and/or actuators in response to signals from various sensors. Controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

Figure 2:
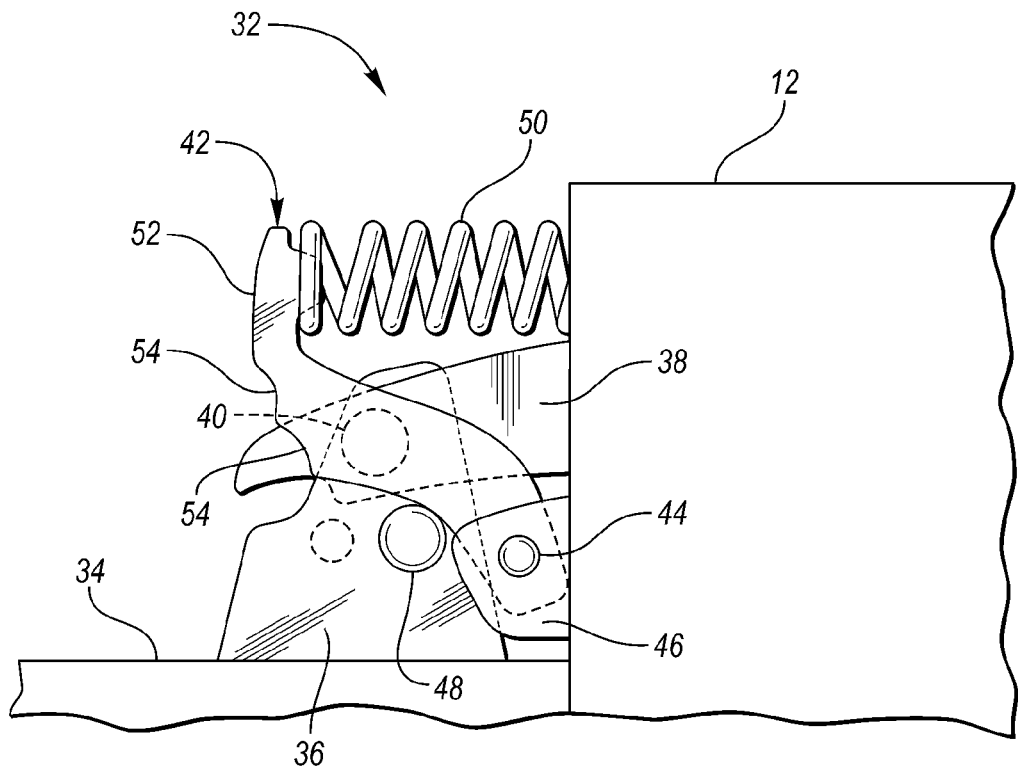
FIG. 2 is an illustration of a first example vehicle door hinge mechanism.

Referring to FIG. 2, a first exemplary vehicle door hinge mechanism 32 is illustrated. The vehicle door hinge mechanism 32 is configured to pivotally attach a vehicle door 12 to a vehicle body structure 34. A body side hinge strap 36 is attached to the vehicle body structure 34 while a door side hinge strap 38 is attached to the vehicle door 12. The door side hinge strap 38 is pivotally connected to the body side hinge strap 36 by a pivot 40, which effectively couples the vehicle door 12 to the vehicle body structure 34. The vehicle door hinge mechanism 32 may also include a detent arm (which may be also referred to as a hinge arm) 42. The detent arm 42 is pivotally connected to the vehicle door 12 by a pivot 44 and bracket 46. While the vehicle door 12 is being opened, the vehicle door 12 and the door side hinge strap 38 rotate about the pivot 40 relative to the vehicle body structure 34. Also while the vehicle door 12 is being opened, a follower 48 travels along a first side 52 of the detent arm 42. Contact is maintained between the follower 48 and the first side 52 of the detent arm 42 by a spring 50 that extends between the detent arm 42 and the vehicle door 12. The first side 52 of the detent arm 42 includes one or more recessed areas (or "valleys") 54 that are configured to retain the follower 48, which in turn retains the vehicle door 12 in partially opened positions.

Figure 3:
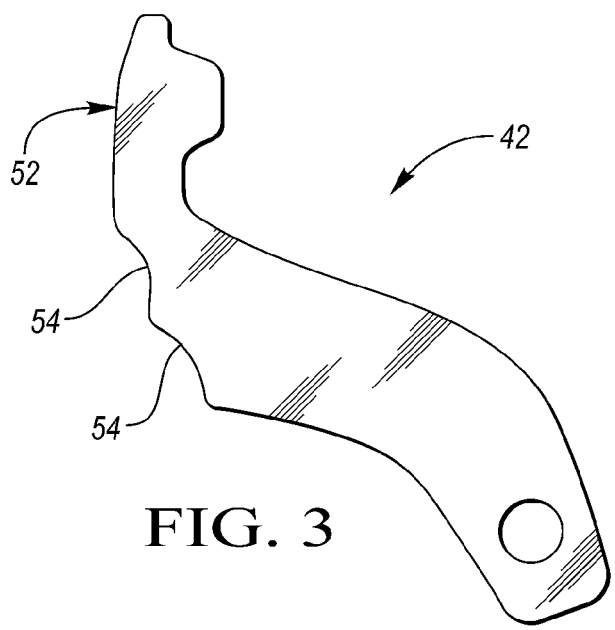
FIG. 3 is an illustration of a detent arm of the example vehicle door hinge mechanism.

Referring to FIG. 3, the detent arm 42 of the exemplary vehicle door hinge mechanism 32 is illustrated. The first side 52 of the detent arm 42, including the recesses areas 54, upon which the follower 48 travels may be referred to as a cam surface, while the follower 48 may be referred to as a cam follower.

Figure 4:
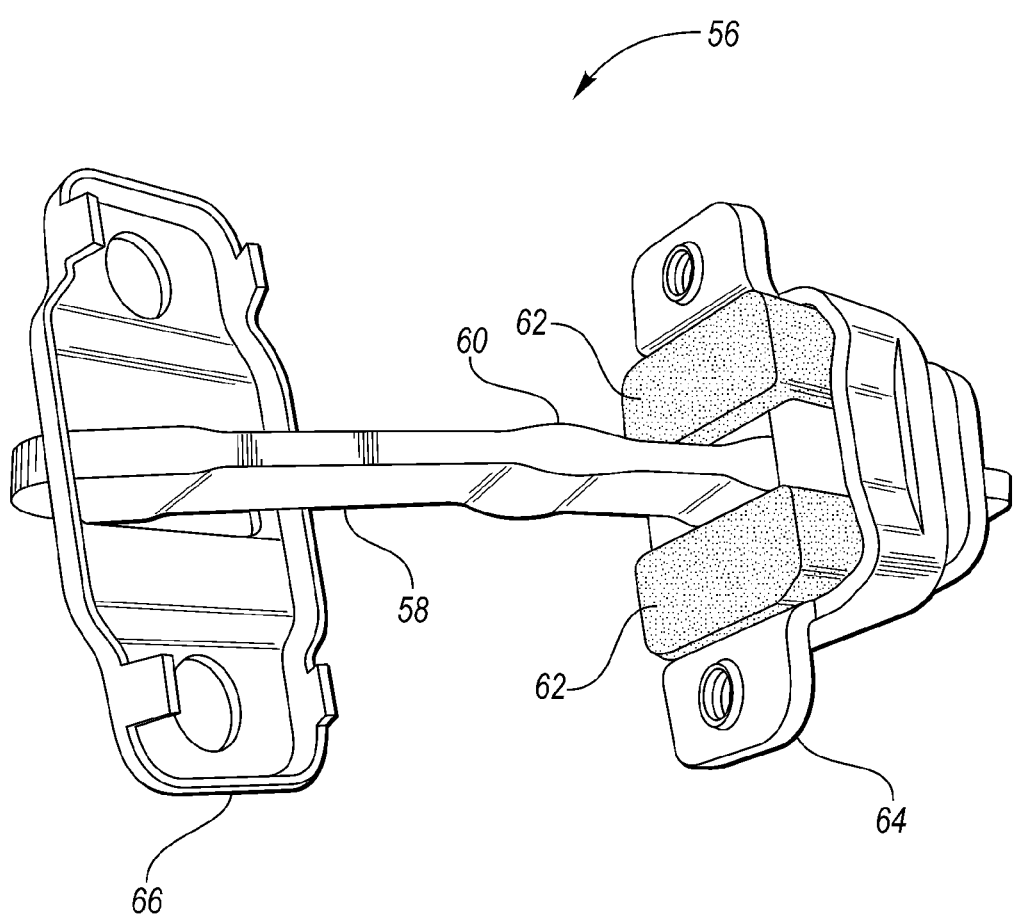
FIG. 4 is an illustration of a vehicle door check strap.

Referring to FIG. 4, a door check strap 56 that is used in conjunction with door hinges is illustrated. The hinges may be any kind of hinge that is capable of rotatably connecting the vehicle door 12 to the vehicle body structure 34. The door check strap 56 and hinges combination may be used in place of the hinge mechanism 32 described in FIG. 2. The door check strap 56 includes a sliding arm 58 (or detent arm) that includes a detent 60. The detent 60 is configured to engage rollers (not shown) that are located behind tensioners 62 in order to hold a vehicle door in a partially opened position. The tensioners act as a spring and provide pressure onto the rollers, which applies pressure to the sliding arm 58 and the detent 60. The door check strap 56 includes brackets 64, 66 that are configured to mount the door check strap 56 to the door 12 and the vehicle body structure 34.

The vehicle door hinge mechanism 32 and door check strap 56 illustrated in FIGS. 2-4 are meant for illustrative purposes only. The disclosure should be construed to include vehicle doors that may be held in partially opened positions by any other type of hinge mechanism or device that is capable of holding a vehicle door in partially opened positions.

Figure 5:
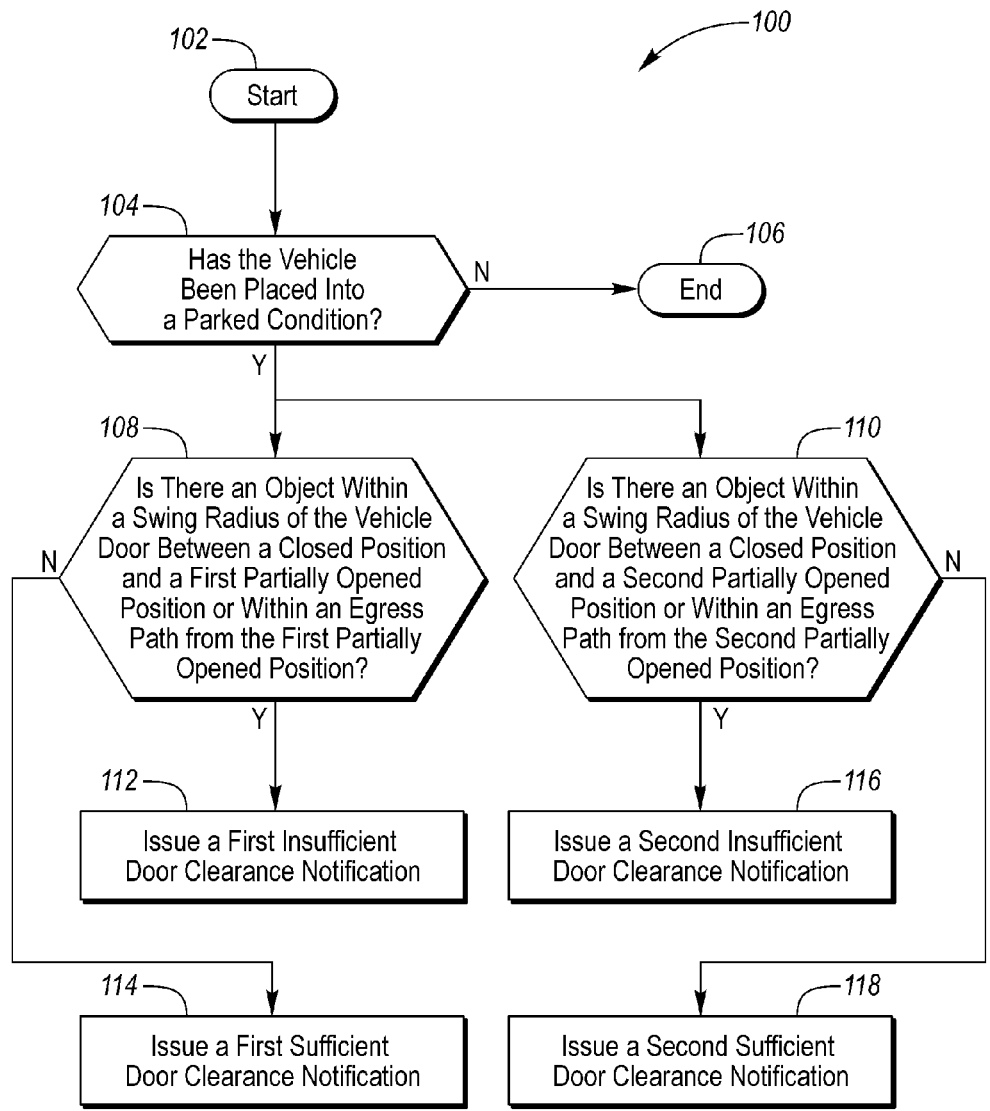
FIG. 5 is a flow chart of an algorithm for notifying a vehicle user if there is clearance to open the vehicle doors to partially opened positions.

Referring to FIG. 5, a method 100 of notifying a vehicle user if there is clearance to open a vehicle door 12 to partially opened position is illustrated. The method is initiated at starting block 102. Once the method has been initiated at starting block 102, the method moves on to step 104 where it is determined if the vehicle 10 has been placed into a parked condition. If the vehicle 10 has not been placed into a parked condition the method end at step 106. If the vehicle 10 has been placed into a parked condition the method moves on to steps 108 and 110. Alternatively, Step 104 may be omitted entirely. The method 100 may move directly to steps 108 and 110 from the starting block 102 with the vehicle in any gear (drive, reverse, neutral, parked, etc.). Furthermore, the method 100 may move to steps 108 and 110 from the starting block 102 regardless if the vehicle 10 is stopped or moving in any direction.

At step 108 it is determined if there is an object within the swing radius 28 of a vehicle door 12 between the closed position 14 and the first partially opened position 18. Alternatively, at step 108, it may be determined if there is an object within the swing radius 28 of a vehicle door 12 between the closed position 14 and a clearance distance beyond the first partially opened position 18. Additionally, at step 108, it may also be determined if there is an object within the egress path from the first partially opened position of the door 23. If there is an object within the swing radius 28 of the vehicle door 12 between the closed position 14 and the first partially opened position 18 (or a clearance distance beyond the first partially opened position 18) or within the egress path from the first partially opened position of the door 23, then the method 100 moves on to step 112 where a first insufficient door clearance notification is issued. If there is no object (or absence of an object) within the swing radius 28 of the vehicle door 12 between the closed position 14 and the first partially open position 18 (or a clearance distance beyond the first partially opened position 18) or within the egress path from the first partially opened position of the door 23, then the method 100 moves on to step 114 where a first sufficient door clearance notification is issued.

At step 110 it is determined if there is an object within the swing radius 28 of a vehicle door 12 between the closed position 14 and the second partially opened position 20. Alternatively, at step 110, it may be determined if there is an object within the swing radius 28 of a vehicle door 12 between the closed position 14 and a clearance distance beyond the second partially opened position 20. Additionally, at step 110, it may also be determined if there is an object within the egress path from the second partially opened position of the door 25. If there is an object within the swing radius 28 of the vehicle door 12 between the closed position 14 and the second partially opened position 20 (or a clearance distance beyond the second partially opened position 20) or within the egress path from the second partially opened position of the door 25, then the method 100 moves on to step 116 where a second insufficient door clearance notification is issued. If there is no object (or absence of an object) within the swing radius 28 of the vehicle door 12 between the closed position 14 and the second partially open position 20 (or a clearance distance beyond the second partially opened position 20) or within the egress path from the second partially opened position of the door 25, then the method 100 moves on to step 118 where a second sufficient door clearance notification is issued.

The method 100 should not be construed as limited to the depiction in FIG. 5, but should be construed to include variations where one or more of the steps may be reorganized chronologically or omitted.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a sideways swinging door, having a swing radius, configured to transition to a predetermined first partially opened position between a fully opened position and a closed position;
a detent arm comprising one or more features configured to engage a roller to retain the door in the first partially opened position; and
a controller programmed to, in response to an object within the swing radius of the door between the fully opened position and the first partially opened position, but not between the first partially opened position and the closed position, issue a notification indicative of sufficient clearance to open the door to the first partially opened position but not to the fully opened position.

2. The vehicle of claim 1, wherein the controller is further programmed to, in response to the object being detected within the swing radius of the door between the closed position and the first partially opened position, issue a notification indicative of insufficient clearance to open the door to the first partially opened position.

3. The vehicle of claim 1, wherein the controller is further programmed to, in response to the object being detected within a zone comprising an egress path from the vehicle when the door is in the first partially opened position, issue a notification indicative of insufficient clearance to open the door to the first partially opened position.

4. The vehicle of claim 3, wherein the controller is further programmed to, in response to the object being detected within the swing radius of the door between the fully opened position and the first partially opened position, but not between the first partially opened position and the closed position nor within the zone comprising the egress path from the vehicle when the door is in the first partially opened position, issue the notification indicative of sufficient clearance to open the door to the first partially opened position but not the fully opened position.

5. The vehicle of claim 1, wherein the door is also configured to transition to a predetermined second partially opened position between the fully opened position and the closed position, and wherein the controller is further programmed to, in response to the object being detected within the swing radius of the door between the fully opened position and the second partially opened position, but not between the second partially opened position and the closed position, issue a notification indicative of sufficient clearance to open the door to the second partially opened position but not the fully opened position.

6. The vehicle of claim 5, wherein the controller is further programmed to, in response to the object being detected within a zone comprising an egress path from the vehicle when the door is in the second partially opened position, issue a notification indicative of insufficient clearance to open the door to the second partially opened position.

7. The vehicle of claim 5, wherein the controller is further programmed to, in response to the object being detected within the swing radius of the door between the closed position and the second partially opened position and an absence of an object being detected within the swing radius of the door between the closed position and the first partially opened position, issue a notification indicative of sufficient clearance to open the door to the first partially opened position but not the second partially opened position.

8. A vehicle comprising:
a passenger door;
a detent arm having features engaging a roller to retain the door in a predetermined partially opened first position; and
a controller programmed to, in response to an object within a swing radius of the door between the first and fully opened positions, but not between the first and closed positions, issue a notification indicating clearance to open the door to the first but not the fully opened position.

9. The vehicle of claim 8, wherein the controller is further programmed to, in response to an object being detected within the swing radius of the door between the closed position and the first position, issue a notification indicative of insufficient clearance to open the door to the first position.

10. The vehicle of claim 8, wherein the controller is further programmed to, in response to an object being detected within a zone comprising an egress path from the vehicle when the door is in the first position, issue a notification indicative of insufficient clearance to open the door to the first position.

11. The vehicle of claim 10, wherein the controller is further programmed to, in response to the object being detected within the swing radius of the door between the fully opened position and the first position, but not between the first position and the closed position nor within the zone comprising the egress path from the vehicle when the door is in the first position, issue the notification indicative of clearance to open the door to the first position but not the fully opened position.

12. The vehicle of claim 8, wherein the controller is further programmed to, in response to an object being detected within the swing radius of the door between the fully opened position and a predetermined second partially opened position, but not between the predetermined second partially opened position and the closed position, issue a notification indicative of sufficient clearance to open the door to the predetermined second partially opened position but not the fully opened position.

13. The vehicle of claim 12, wherein the controller is further programmed to, in response to the object being detected within a zone comprising an egress path from the vehicle when the door is in the second partially opened position, issue a notification indicative of insufficient clearance to open the door to the predetermined second partially opened position.

14. The vehicle of claim 12, wherein the controller is further programmed to, in response to the object being detected within the swing radius of the door between the closed position and the predetermined second partially opened position and an absence of an object being detected within the swing radius of the door between the closed position and the first position, issue a notification indicative of sufficient clearance to open the door to the first position but not the predetermined second partially opened position.

15. An obstruction warning method for a vehicle passenger door that is retainable in one or more partially opened detent positions via corresponding detent arm features engaging a roller comprising:
issuing a notification indicative of clearance to open the door to a predetermined partially opened detent position, but not a fully opened position, in response to an object within a swing radius of the door between the predetermined partially opened detent and fully opened positions, but not between predetermined partially opened detent and closed positions.

16. The method of claim 15, further comprising issuing a notification indicative of insufficient clearance to open the door to the predetermined partially opened detent position in response to the object being detected within the swing radius of the door between the closed position and the predetermined partially opened detent position.

17. The method of claim 15, further comprising issuing a notification indicative of insufficient clearance to open the door to a predetermined second partially opened detent position in response to the object being detected within the swing radius of the door between the closed position and the second predetermined partially opened detent position.

18. The method of claim 17, issuing a notification indicative of sufficient clearance to open the door to the predetermined partially opened detent position but not the predetermined second partially opened detent position in response to an object being detected within the swing radius of the door between the closed position and the predetermined second partially opened detent position and an absence of an object being detected within the swing radius of the door between the closed position and the predetermined partially opened detent position.

* * * * *